United States Patent Office 2,812,367
Patented Nov. 5, 1957

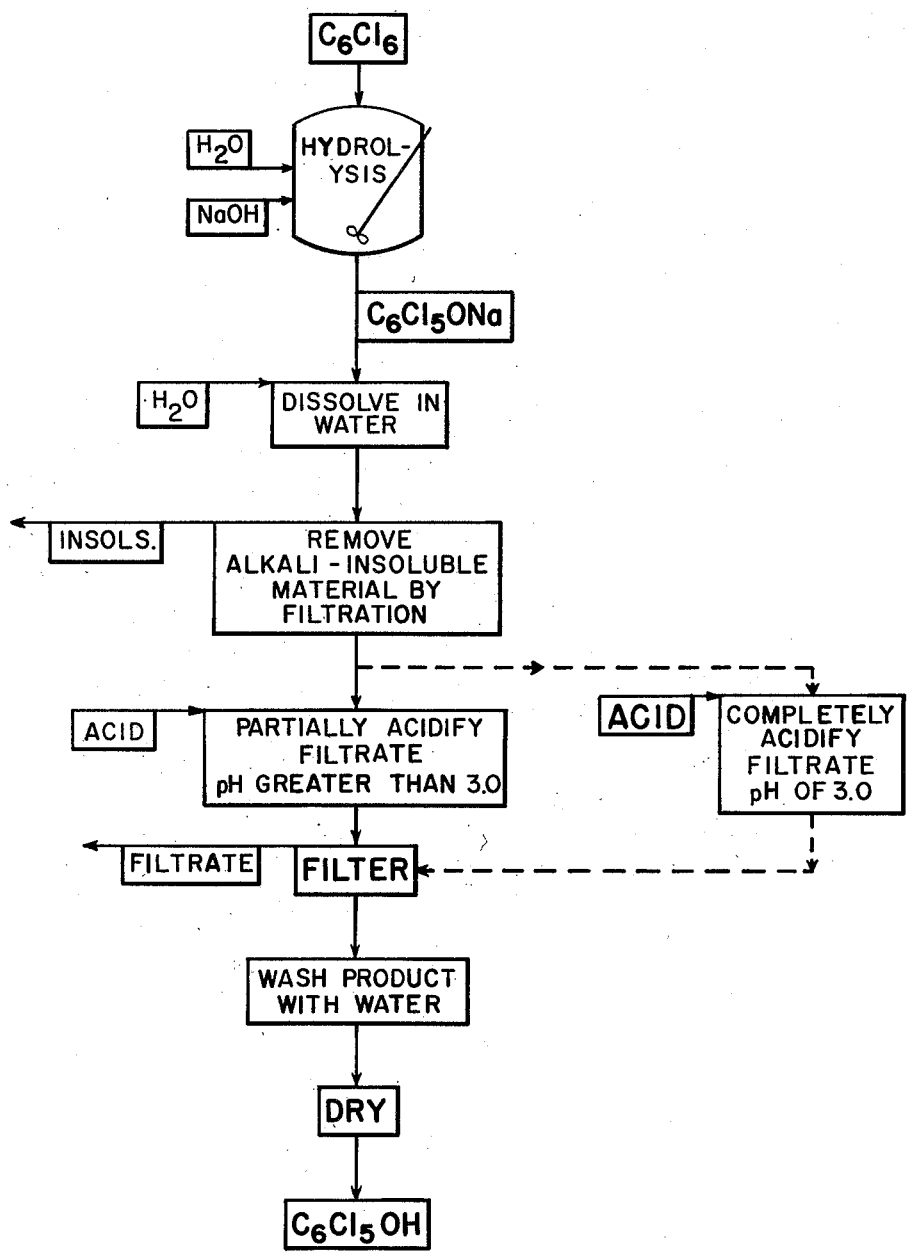
INVENTOR.
ALFRED HIRSCH
IRVING ROSEN
BY

2,812,367

IMPROVEMENTS IN THE PREPARATION OF POLYCHLOROPHENOLS IN AQUEOUS MEDIUM

Alfred Hirsch and Irving Rosen, Painesville, Ohio, assignors to Diamond Alkali Company, Cleveland, Ohio, a corporation of Delaware Application April 2, 1954, Serial No. 420,557

5 Claims. (Cl. 260—623)

This invention relates to improvements in the preparation of polychlorophenols, and more particularly relates to the preparation of pentachlorophenol by the alkaline hydrolysis of hexachlorobenzene in an aqueous medium.

In the past, it has been proposed to form pentachlorophenol by hydrolyzing hexachlorobenzene in an alcoholic alkaline medium. However, such prior methods generally have produced reaction products of insufficient purity to render commercial use of such processes practicable where a product of high purity is required. Not only have the products obtained by prior methods contained impurities which preclude the use of such products in many applications, but also the use of an alcohol in the hydrolysis reaction has necessarily increased the cost of operation and, in many instances, introduced a fire hazard by requiring the storage and use of large amounts of highly flammable liquids.

Among the methods heretofore proposed for producing a satisfactory pentachlorophenol by alcoholic alkaline hydrolysis of hexachlorobenzene has been a process utilizing a selective salting out of pentachlorophenate from the hydrolysis mass. However, such a process is relatively costly and has not provided a satisfactory solution to the problem. Another prior method involves the use of a tertiary alcohol as a hydrolysis medium. However, such a process again involves the use of a relatively costly hydrolysis medium with the attendant difficulties encountered by way of fire hazard in the storage of the alcohol.

It is, therefore, the principal object of the present invention to avoid the difficulties heretofore encountered in the alkaline hydrolysis of polychlorobenzenes to form polychlorophenols.

It is a further object to provide a method of preparing polychlorophenols which is not only simple and relatively inexpensive in operation, but also produces a product of high purity.

Another object of the present invention is to provide an improved method for the production and purification of pentachlorophenol.

Another object of the invention is the provision of a process of hydrolyzing hexachlorobenzene to form substantially pure pentachlorophenol in a commercially feasible manner.

These and other objects and advantages of the invention will appear from the following description of the invention.

It has been found now that by reacting a mixture consisting essentially of a polychlorobenzene, water, and an alkali in a non-alcoholic medium to produce, upon subsequent acidification of the reaction product, a polychlorophenol of improved purity is obtained in a yield which renders the process commercially feasible.

More particularly, the present invention is directed to a method of preparing pentachlorophenol by the alkaline hydrolysis of hexachlorobenzene by a method comprising the steps of reacting a mixture consisting essentially of hexachlorobenzene, water, and a material selected from the group consisting of alkali metal hydroxides and $NaOH \cdot Na_2SO_4 \cdot NaCl$ triple salt, dissolving the thus-obtained reaction product in water, filtering the resultant solution, acidifying the filtrate, and obtaining substantially pure pentachlorophenol from the acidified material by filtration, washing and drying.

Generally, it is preferred to acidify the above-mentioned filtrate only partially, i. e., to a pH greater than 3.0, to obtain a pentachlorophenol having an improved purity, as evidenced by its melting point. However, satisfactory products are obtained in many instances by completely acidifying the filtrate to a pH of 3.0, as typically evidenced by the color change from red to blue using Congo red as an indicator, e. g., the so-called "Congo red blue" point.

Referring now to the drawing attached hereto and forming a part hereof, there is presented a chemical process flowsheet illustrating the principles of the present invention for the manufacture of pentachlorophenol. It will be understood, of course, by those skilled in the art that while the drawing describes the process in terms of one illustrating the preparation of pentachlorophenol, the present invention also contemplates the preparation of other polychlorophenols, utilizing other hydrolyzable polychlorobenzenes, such as trichlorobenzene, tetrachlorobenzene, or pentachlorobenzene.

In the drawing, it will be noted that hexachlorobenzene, water, and sodium hydroxide are combined in a suitable reactor. It will be understood, of course, that the hexachlorobenzene may be the chemically pure product, i.e., sublimed hexachlorobenzene (M. P. 226°–228° C.) or crude hexachlorobenzene (M. P. 224°–226° C.), as well as various so-called "underchlorinated hexachlorobenzenes (M. P. 204°–215° C.), the ultimate quality of the pentachlorophenol produced depending, of course, upon the purity of the hexachlorobenzene material utilized. Similarly, while sodium hydroxide is indicated on the flowsheet and is the preferred alkali, the present invention also contemplates the use of other alkali metal hydroxides, such as potassium hydroxide, as well as the triple salt $NaOH \cdot Na_2SO_4 \cdot NaCl$, which is obtained, for example, as a product of the treatment of caustic soda with $Na_2SO_4$ for chloride removal.

The conditions under which the hydrolysis takes place depend to a large degree upon the particular polychlorobenzene being hydrolyzed, it being preferred to effect substantially complete hydrolysis. In the case of hexachlorobenzene, utilizing a reaction mixture consisting of 1 mol of $C_6Cl_6$, 2.0 to 2.5 mols of NaOH, and 850 to 1050 ml. of $H_2O$, it has been found that superior results are obtained when the hydrolysis occurs at a temperature within the range from about 190° C. to 285° C. at a pressure within the range of from approximately 160 to 540 p. s. i. and for a time witihn the range of about 30 to 90 minutes, a suitable time being 65 minutes.

The hydrolysis product of such a reaction, which, using sodium hydroxide, is substantially all sodium pentachlorophenate, is then dissolved in water. The resultant solution is filtered to remove alkali-insoluble substances as filter cake, and is subsequently acidified with an acid, such as sulfuric acid or a halogen acid, such as hydrochloric acid or hydrobromic acid.

In a preferred embodiment, the hydrolysis product is only partially acidified, as contrasted to completed acidification, i. e., the expression "complete acidification," as used herein, meaning acidification to a pH of 3.0. Superior results have been obtained in the practice of the present invention when the product is only partially acidified, i. e., the acidification is carried on to a pH greater than 3.0, the resultant product having a higher purity as evidenced by its melting point.

The control of the acidification step may be by pH meter or by the addition of a calculated quantity of acid insufficient for complete acidification. Similar results, insofar as resultant product purity is concerned, are obtained by complete acidification, i. e., to a pH of 3.0, with subsequent back titration using caustic soda to a pH greater than 3.0. A typically practicable partial acidification step, as outlined above, provides a resultant hydrolysis product which is acidified to a point within the range of approximately 95% to 98%, based on the weight of material acidified, of complete acidification. In some instances, depending on the product purity required, the hydrolysis product may be subjected to complete acidification, i. e., to a pH of 3.0, as indicated by the broken line in the drawing.

Following the acid treatment, the resultant material is filtered, the filtrate being discharged. The crystalline product is then washed with water and dried in any suitable manner to obtain substantially pure pentachlorophenol.

Illustrative of the product purity obtained by the practice of the present invention when the hydrolysis product is completely acidified is a pentachlorophenol containing about 4% impurities and having a melting point within the range of about 170° to 182° C. On the other hand, a pentachlorophenol obtained by partial acidification, as described herein, has a melting point range of 180° to 186° C.

In certain instances, it is desirable to employ, in the aqueous hydrolysis medium, a small amount, typically 1.0 gram per 850 to 1050 ml. of H₂O, of a wetting agent, such as the commercially available product known as Di-Oqua (alkyl-arylsulfonate).

The following specific examples are offered in order that those skilled in the art may better understand the method of the present invention and the manner in which it may be carried into effect, as well as to provide a basis for the preferred conditions herein set forth:

EXAMPLE I

Part A

One mol (285 grams) of crude $C_6Cl_6$ is charged into an open autoclave together with 2.5 mols (102 grams) of NaOH and 850 ml. of $H_2O$. The autoclave is then closed and the mixture is heated at a temperature within the range of 245° to 255° C., and at a pressure of between 490 to 540 p. s. i., for a total time of 65 minutes. The autoclave is allowed to cool for 15 minutes to 225° C. Water is then run through the cooling coils of the autoclave for about 2 hours before the autoclave is opened. The reaction product is dissolved in water and the solution is filtered, giving 11.0 grams of a brown-black colored precipitate having a melting point greater than 233° C., and 2800 ml. of filtrate.

Part B 1000 ml. of the filtrate of Part A above is acidified to the Congo red blue point (pH of 3.0) with 61.0 ml. of 18% hydrochloric acid (complete acidification). The product is filtered, washed once with 800 ml. of $H_2O$, and is dried at 70° C. 86.0 grams of product is obtained having a melting point within the range of 170° to 182° C. and a freezing point of about 179° C. The yield is 90.4%.

Part C 1000 ml. of the filtrate of Part A above is incompletely acidified with 58.0 ml. of 18% hydrochloric acid. The product is filtered, washed once with about 800 ml. of water, and is dried at 7° C. 83.0 grams of a product is obtained having a melting point within the range of 180° to 186° C. and a freezing point of about 183° C. This partial acidification treatment gives a higher melting pentachlorophenol than is obtained in Part B above by complete acidification.

Part D

The filtrate of Part C, after incomplete acidification, is acidified to the Congo red blue point (pH of 3.0) with 5 ml. of 18% hydrochloric acid. The product is filtered, washed, and dried. 2.0 grams of product is thereby obtained having a melting point within the range of 125° C. to greater than 190° C.

EXAMPLE II

One mol (285 grams) of crude $C_6Cl_6$ is charged into an open autoclave, together with the triple salt $$NaOH \cdot Na_2SO_4 \cdot NaCl$$

in 875 grams of water. The autoclave is closed and the hydrolysis is carried on at a temperature within the range of 245° to 255° C. for about 65 minutes at a pressure within the range of 440 to 540 p. s. i. The reaction product is then treated as in Example I, Parts A, B, and C, to give a 91% yield of pentachlorophenol having substantially the same quality as is obtained using sodium hydroxide as the alkaline material under similar conditions in Example I.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of preparing a polychlorophenol by the alkaline hydrolysis of hexachlorobenzene, said method comprising the steps of reacting a mixture consisting essentially of a hydrolyzable hexachlorobenzene, water, and a material selected from the group consisting of alkali metal hydroxides and the triple salt $$NaOH \cdot Na_2SO_4 \cdot NaCl$$

to effect hydrolysis of said hexachlorobenzene, dissolving the thus-obtained product in water, removing insoluble material from the resultant solution, partially acidifying the solution to effect precipitation of a major proportion of a polychlorophenol, and thereafter removing substantially pure polychlorophenol from the acidified solution.

2. The method of preparing pentachlorophenol by the alkaline hydrolysis of hexachlorobenzene, said method comprising the steps of reacting a mixture consisting essentially of hexachlorobenzene, water, and a material selected from the group consisting of alkali metal hydroxides and $NaOH \cdot Na_2SO_4 \cdot NaCl$ to effect hydrolysis of said pentachlorophenol, dissolving the thus-obtained product in water, filtering the resultant solution, partially acidifying the filtrate thereby obtained to effect precipitation of a major proportion of substantially pure pentachlorophenol, and subsequently removing substantially pure pentachlorophenol therefrom.

3. The method of claim 1 wherein the filtrate is acidified to a pH greater than 3.0.

4. The method of preparing pentachlorophenol by the alkaline hydrolysis of hexachlorobenzene, said method comprising the steps of reacting, at an elevated temperature and pressure, a mixture consisting essentially of hexachlorobenzene, water and a material selected from the group consisting of alkali metal hydroxides and $$NaOH \cdot Na_2SO_4 \cdot NaCl,$$

dissolving the thus-obtained product in water, filtering the resultant solution to remove insoluble material therefrom, and partially acidifying said filtered solution to about 97.5% of complete acidification, filtering the acidified solution to obtain a crystalline residue, thereafter washing and drying said residue.

5. In the alkaline hydrolysis of hexachlorobenzene to pentachlorophenol, the improvement which consists of conducting said hydrolysis in a non-alcoholic alkaline aqueous medium and subsequent partially acidifying the product of said hydrolysis to form substantially pure pentachlorophenol.

References Cited in the file of this patent

UNITED STATES PATENTS

| | | |
|---|---|---|
| 2,107,650 | Smith et al. | Feb. 8, 1938 |
| 2,137,587 | Poffenberger | Nov. 22, 1938 |
| 2,563,815 | Bruce | Aug. 14, 1951 |
| 2,748,174 | Jenny et al. | May 29, 1956 |